United States Patent [19]

Le Roy

[11] 3,773,978

[45] Nov. 20, 1973

[54] TIME SWITCH FOR CONNECTING MULTIPLEX SYSTEMS

[75] Inventor: Guy Le Roy, Lannion, France

[73] Assignees: Societe Lannionnaise D'Electronique, Lannion; Compagnie Industrielle Des Telecommunications Cit-Alcatel, France

[22] Filed: Dec. 22, 1971

[21] Appl. No.: 210,762

[30] Foreign Application Priority Data

Dec. 22, 1970 France .............................. 7046275

[52] U.S. Cl. .............................................. 179/15 AQ
[51] Int. Cl. ............................................... H03j 3/00
[58] Field of Search .................. 179/15 AQ, 18 FC, 179/15 AT

[56] References Cited

UNITED STATES PATENTS

| | | | |
|---|---|---|---|
| 3,461,242 | 8/1969 | Inose | 179/15 AQ |
| 3,622,705 | 11/1971 | Duerooth | 179/15 AQ |
| 3,217,106 | 11/1965 | Muroga | 179/15 AQ |
| 3,597,548 | 8/1971 | Drinnan | 179/15 AT |
| 3,236,951 | 2/1966 | Yamamoto | 179/15 AQ |
| 3,263,030 | 7/1966 | Stiefel | 179/15 AQ |

FOREIGN PATENTS OR APPLICATIONS

| | | | |
|---|---|---|---|
| 41/6376 | 4/1966 | Japan | 179/15 AQ |

*Primary Examiner*—Kathleen H. Claffy
*Assistant Examiner*—David L. Stewart
*Attorney*—Paul M. Craig, Jr. et al.

[57] ABSTRACT

Time switch comprising propagation means (delay lines) in which the incoming data is propagated during a certain time, that time being determined by the difference in actual time separating the incoming multiplex channel from the outgoing multiplex channel which distributes the data. The difference in actual time may change from frame to frame.

9 Claims, 4 Drawing Figures

TIME SWITCH FOR CONNECTING MULTIPLEX SYSTEMS

The invention concerns a time switch which can be used in time division multiplex link interconnection system used for digital or analog data transmission implemented in the production of telecommunication, remote control and remote signaling networks, etc.

A time switch is an element connected to two time division multiplex systems, which distributes, on an output multiplex system having a capacity of $s_o$ channels and in an order S, the data applied from an input multiplex system having a capacity of $e_o$ channels in an order E, data applied on a channel Ei of the input multiplex system being switched to a channel Sj of the output multiplex system; the distribution takes place under the control of a memorized program describing the relation EiSj between the time slots, or order numbers, data in the input and output multiplex frames, the said time slots being expressed on the basis of an orgin characterized in each frame by a frame locking or frame synchronizing word. The frames of the input and output multiplex systems can have the same period T, but it is not always the case; the instants at the beginning of the frame are not necessarily in phase, and the capacities of the multiplex systems are, at random, equal or otherwise.

In general way, a time switch consists of a control circuit and a time connection circuit, the control circuit memorizes either a fixed program or a program defined by chance by units outside the switch, and drives, on the basis of this program, the time connection circuit which, under the control of the control circuit, corss-connects, in time, the data coming from the input multiplex system.

In my copending application Ser. No. 181,953, filed on Sept. 20, 1971, there is described a system of time switches operating on the principle of storage in addressable memories of the data to be cross-connected.

The present invention has for its object a time switch intended for distributing to a time division output multiplex system the data applied from a time division input multiplex system *e* by making an input channel or time channel Ei correspond to an output channel Sj, the said multiplex system having a variable frame phase, but their lines being in phase in the channels, the channels having the same duration and being synchronous, the frames having, preferably, but not compulsorily, the same period, or periods very much alike, characterized in that it comprises propagation means in which the input data is propagated during a certain time, that propagating time being determined by the difference in actual time separating the input multiplex channel on which data is applied, from the output multiplex channel sending out the said data, and means for switching the said input data through the said propagating means towards the output multiplex system.

The invention is also characterized in that the propagating means consists of a time connection circuit accessible from means for switching the data by a set of time slots D, or two sets of time slots D and D′ and comprising essentially either D delay lines having a length of *o*, *d*, 2*d* . . . D*d*, *d* being an elementary delay equal to the duration of a channel in the input multiplex system or in the output multiplex system, or a delay line having a length of (D–1) *d* consisting of (D–1) delay lines having a length of *d* connected in series and having D outputs, these lines having inputs accessible from the input multiplex system by an input circuit, and the outputs connected to the output multiplex system by an output circuit, and in which the data coming from the input multiplex system transmits towards the output multiplex system, a selection at the input or at the output, or at the input and at the output, being made by means of the time slots D or of the time slots D and D′, under the control of a control circuit, and in that the means for switching the data form a control circuit essentially consisting of a connection memory in which the data of the connections, of a calculation circulating circuit determining time slots D, and possibly of an output memory effecting the dephasing of the time slots D coming from the calculating circuit to generate time slots D′.

The time slots D or the time slots D and D′ for controlling the time connection circuit are determined by calculating, for each connection and throughout the whole duration of the communication, the dephasing in actual time which must be undergone by the input data carried by a channel Ei of the input multiplex system to be applied on the channel Sj, connected to the output multipelx system, from the stored data concerning the connections EiSj, this data being supplied at the instant when the cummunications are established, and under the control of the input time slots E and output time slots S of the input multiplex channels and output multiplex channels sent out by two input and output time slot generators associated with the multiplex systems in the clock pulse formats of the said multiplex systems.

The input multiplex system whose capacity is $e_o$ words or channels can consist of multiplexing of N elementary multiplexes having a capacity of *eo*/N each, these elementary multiplexes being in phase in the frames or otherwise; the set of time slots E consists of multiplexing of the sets of time slots transmitted by the time slot generators associated with each elementary multiplex.

The output multiplex system whose capacity is so words or channels can be decomposed by demultiplexing the data into several elementary multiplexes, the demultiplexing also being applied to the time slots S coming from the output time slot generator to form, as the case may require, the time slots associated with each elementary multiplex.

The time slot generators for time slots E and S generally from an integral part of the control circuit; if the time slot generators for time slots E and S are exterior to the switch, the latter then comprises time slot receivers connected to the said time slot generators.

The delay lines are of the continuous propagation type such as cables, optical fibers, wave guides, or of the discontinuous propagation type such as shift registers.

The input or output elements of the delay lines are analog switching elements when this data to be transmitted has an analog structure.

The transmission of samples in the connection circuit is of the series type or of the parallel type when the data to be transmitted is a digital code with *p* moments.

The previously defined delay lines consist respectively of *p* identical dleay lines operating in parallel and each assigned to the transmitting of one of the moments of the code when the connection circuit is of the parallel type.

The input or output elements of the delay lines are of the series or parallel type, according to whether the connection circuit is itself of the series or parallel type.

The input and output multiplex systems and the connection circuit are, optionally and independently from one another, of either the series transmission or parallel transmission type, the input or output circuits of the delay lines ensuring transformation.

The number *D* of delay lines to be implemented is a function of the performances required of the switch: if *D* is such that $Dd = T$, a frame period of the multiplex, the switch is without locking means, that is, any input channel can be put in relation with any output channel. If *D* is such that $Dd < T$, the switch has locking means and only input channels out of phase within certain limits in relation to the output channels, can be put in relation.

The connection control memory is of the reading type only, or of the reading-writing type, with direct or indirect addressing, of the matrix or circulating type; the data concerning the connection being, here, Ei Sj, one of these addresses is used for the selection of a word in the control memory in which the other address is stored.

The output control memory is of the direct access addressable or circulating type.

The invention will be well understood from the following description of the embodiments of switches receiving digital data, given only by way of examples and with reference to the figures in the accompanying drawings, in which:

FIG. 1 shows a time switch according to the invention, implementing delay lines, addressable control memeories and a calculating circuit. The switch comprises a connection circuit 1 and a control circuit 2.

Figure 1:
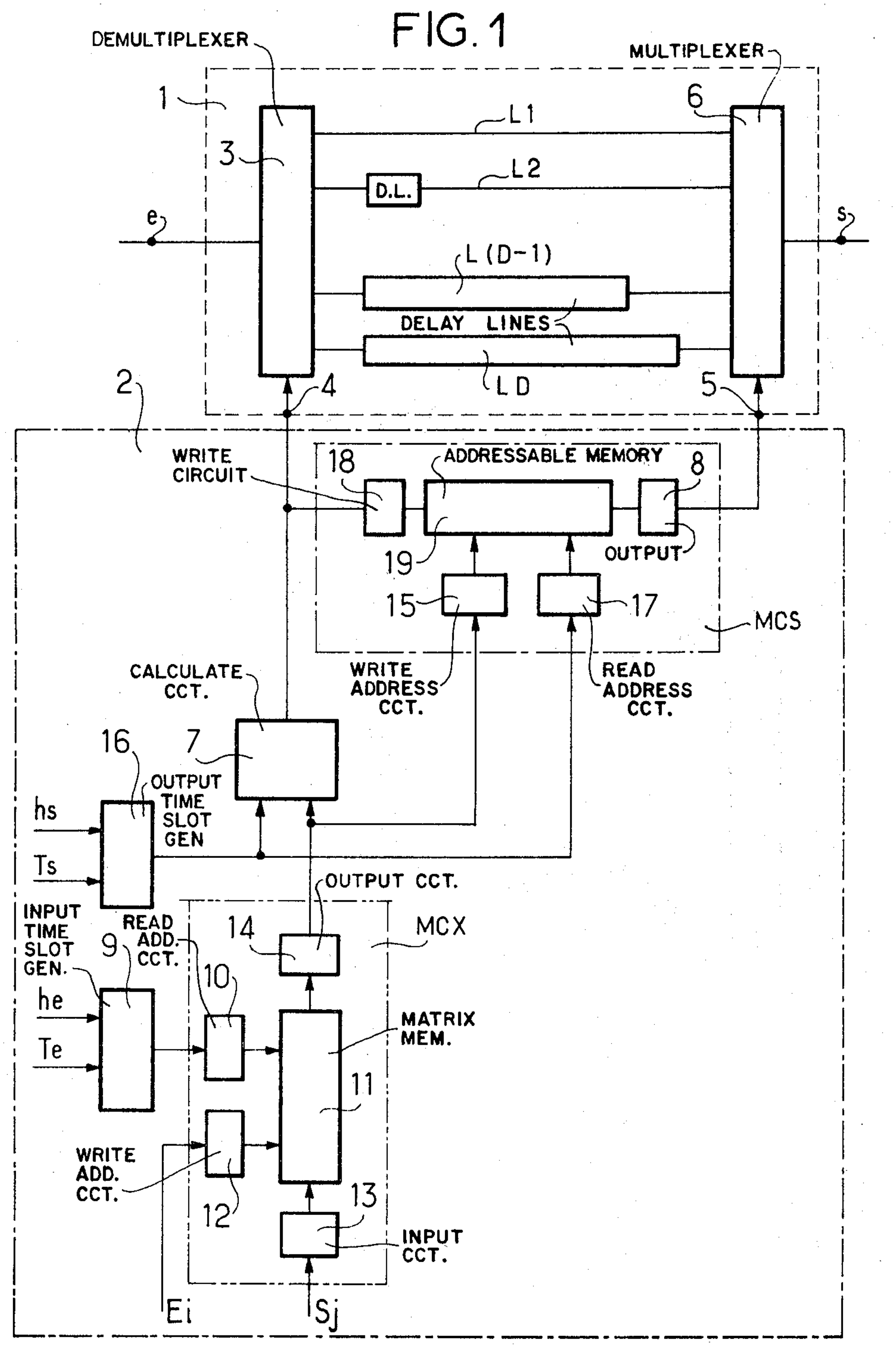
FIG. 1 is a schematic block diagram of a switch having two control memories, in which D is calculated before the transmission in the delay line of the data to be cross-connected, (previous ascertainment of the path in the connection circuit).

The connection circuit 1 comprises an input circuit 3, *D* delay lines L1, L2 . . . LD, and an output circuit 6; the input circuit 3 consists essentially of a demultiplexer having one input and comprises *D* outputs, whose input is connected to an input multiplex *e*, and the outputs to the inputs of the *D* delay lines L1, L2 . . . L(D–1), LD, the said input circuit also comprising a control input 4 connected to the output of a calculating circuit 7; the *D* delay lines L1, L2 . . . L (D–1), LD, having respective lengths of *o, d.* 2*d* . . . (D–2)*d*, (D–1)*d*, *d* being the duration of a channel, some multiplexes have their inputs connected to the outputs of the access circuit 3 and their outputs to the inputs of the output circuit 6. The output circuit 6 consists essentially of a multiplexer having D inputs and one output, whose inputs are connected to the outputs of the delay lines L1, L2 . . . LD and the output to the output multiplex, the said output circuit comprising, also, a control input 5 connected to the output of an output circuit 8 of an output control memory MCS.

The control circuit 2 comprises an input time slot generator 9 for time slots E, a connection memory MCX, an output time slot generator 16 for time slots S, the calculating circuit 7, the output control memory MCS; the time slot generator 9 for time slots E is synchronized by the clock *he* and the frame locking word Te of the input multiplex, whose output is connected to the reading address circuit 10 of the connection memory MCX.

The connection memory MCX consists of an addressable matrix memory circuit 11 having a capacity of *eo* words comprising log (2) so binary elements in the hypothetical case where the control addresses are stored in binary code, a writing address circuit 12, an input circuit 13, the reading address circuit 10 and an output circuit 14. The inputs of the circuits 12 and 13 are connected to the control elements exterior to the switch which, through them, write the data concerning the connection in MCX. The output of the connection memory output circuit 14 of the connection memory is connected to the calculating circuit 7, on the one hand, and to a writing address circuit 15 of the MCS on the other hand.

The time slot generator 16 is synchronized by the clock hs and the locking word Ts of the frame of the output multiplex, and its output, is connected to the calculating circuit 7, on the one hand, and to the reading address circuit 17 of the output control memory MCS, on the other hand.

The calculating circuit 7 has its inputs connected to the outputs of the time slot generator 16, and to the output circuit 14 of the connection memory MCX and its output is connected to the writing circuit 18 of the output control memory MCS on the one hand, and at the input 4 of the input circuit 3 of the connection circuit; the output control memory MCS consists of the wirting address circuit 15; of the reading address circuit 17; of the writing circuit 18; of an output circuit 8 and of an addressable memory 19 having a capacity of so words comprising log (2) *D* binary elements.

The exterior control elements mentioned are calculators ensuring the handling of requests for connections coming from the multiplex equipment connected to the system of which the switch forms a part.

On all requests for a connection between a channel Ei and a channel Sj, the calculators write in the memory circuit 11 of the connection memory MCX and at the address Ei, the address Sj of the channel to be connected, through the writing address and input circuits 12 and 13, this operation constituting the switch marking operation.

This writing being effected, operation is automatic:

The memory circuit 11, scanned, during reading, through the addressing circuit 10 by the input time slot generator 9, in phase with the application to the input multiplex *e*, of the data carried by the time slot channel Ei, sends out, through its reading circuit 14, the address Sj of the output channel to be connected.

This address Sj is applied to the calculating circuit 7 which receives, moreover, from the output time slot generator 16, more particularly at the instant when Sj is applied to the output of 14, a number address Sk.

The claculating circuit elaborates, on the basis of this data, the time slot Dij corresponding to the connection Ei Sj, analyzing the difference R betwen the time slots Sj and Sk: R = Sj–Sk If R ⩾ *o* Dij = Sj–Sk If R < *o* Dij = $s_o$ + Sj–Sk The output of the circuit 7 therefore displays Dij, which, on the one hand, is stored at the address Sj in the memory 19 through the circuits 15 and 18, and, on the other hand, positions the input circuit 3 of the connection circuit on the output Dij, thus connecting the input multiplex to a delay line whose length corresponds to the delay *d* Dij which the Ei time slot sample must undergo to reach the output multiplex in the Sj time slot channel.

When the time slot Sj passes, the memory 19, scanned from the generator 16 through the circuit 17, displays on its output circuit 8 the address *D'ij = Dij* which causes the orientation of the output circuit 6 of the connection circuit on the delay line whose address is *Dij* on whose output, at that instant, is applied the sample coming from the channel Ei, which is then applied by the output circuit 6 to the output multiplex *s*.

It can be observed that the relative phase of the input and output multiplex frames can be chosen at random, and on the other hand, that that phase can vary in time, *D* being calculated at each passing of a sample Ei.

At the instant when the communication is ended, the control calculators erase the word Ei from the memory circuit 11 by writing zero; when the time slot Ei passes, the output circuit 14 of MCX sends out the time slot S =*o*, which, when detected at the level of the calculating circuit 7 inhibits the calculating operations. The output of 7 does not, in that case, transmit any address; the connection circuit therefore remains in the rest position.

Figure 2:
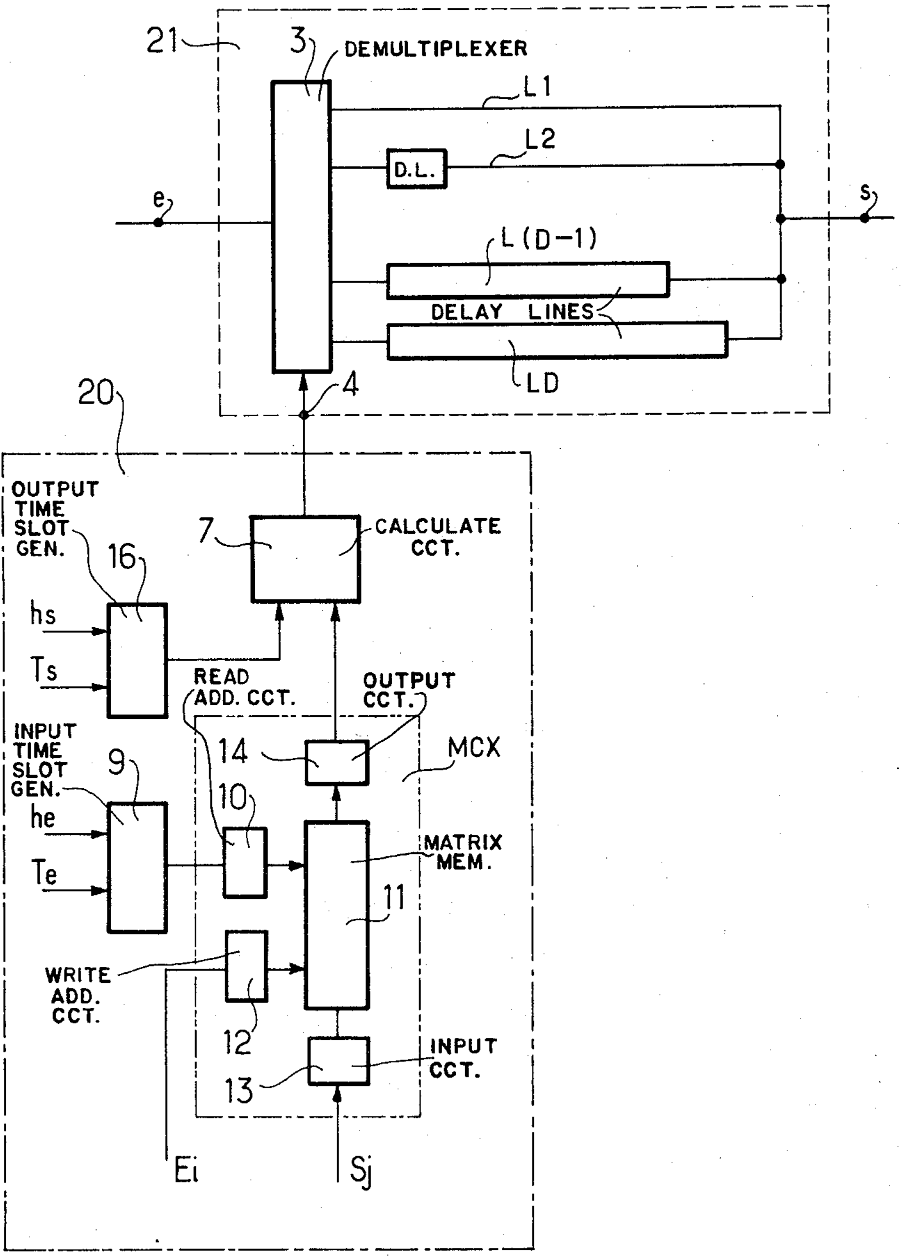
FIG. 2 is a schematic block diagram of a switch operating on the same principle as the switch illustrated in FIG. 1, but without any output control memory.

FIG. 2 shows a switch operating on the same principle as that of the switch in FIG. 1, but the output control memory MCS does not exist. Indeed, in the majority of cases, the output circuit 6 can be a simple OR gate connecting the outputs of the delay lines to the output multiplex; in that case, the output control memory MCS is useless and does not exist.

The control circuit 20 in FIG. 2 therefore consists of the same elements as the control circuit 2 in FIG. 1, except for the output control memory, which does not exist.

Operation is analogous to that defined for the preceding switch, with the exception that the samples reach the output multiplex connected permanently to all the lines, without switching at the delay line output. This is possible, since only one single sample is sent out by these lines at a given instant corresponding to a given channel Sj. The connection circuit 21 in FIG. 2 is analogous to that in FIG. 1, except for the output circuit 6, which does not exist.

Figure 3:
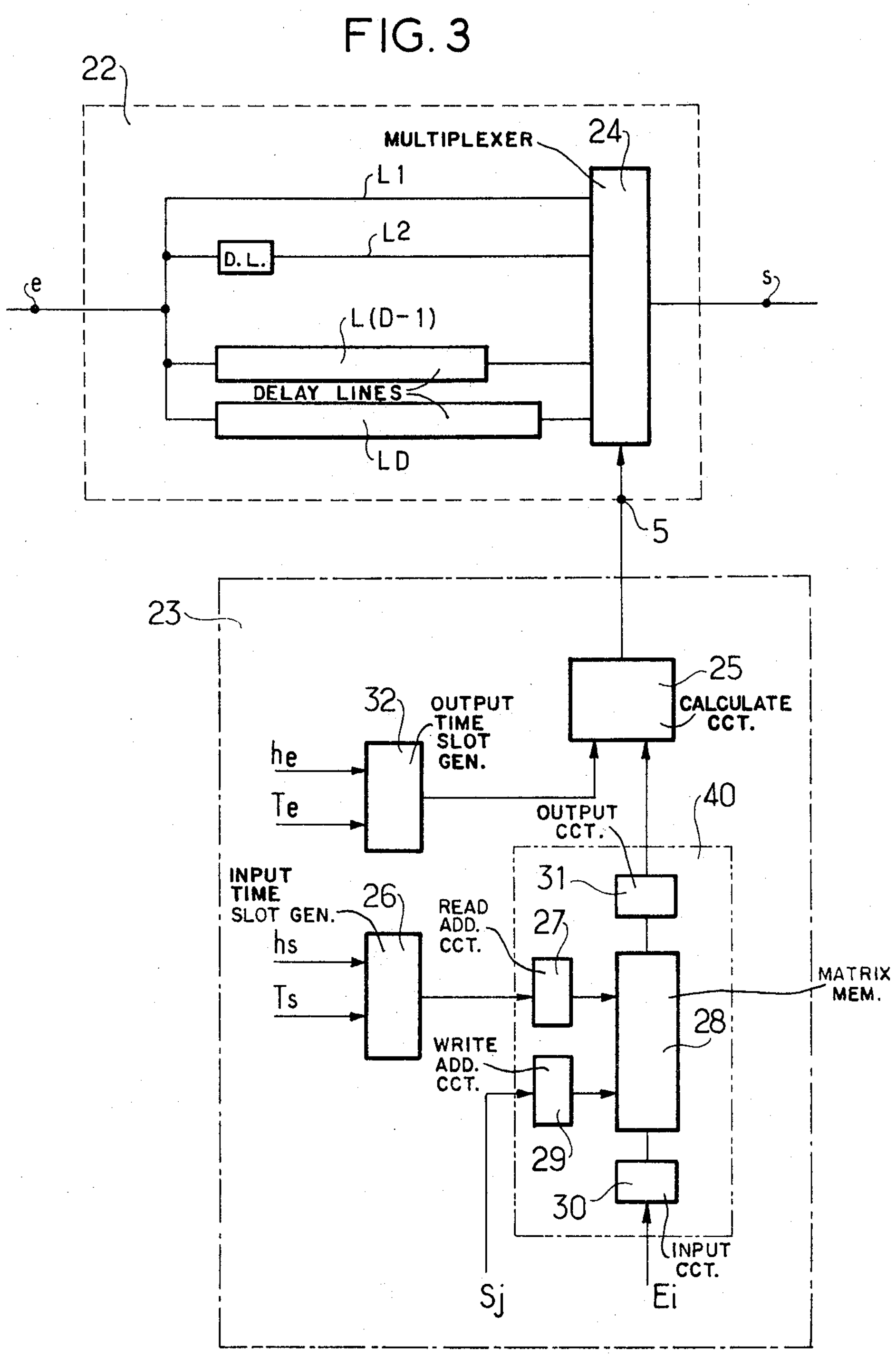
FIG. 3 is a schematic block diagram of a switch where the calculation of D is effected at the instant when the output multiplex is formed, the data transmitting in all the delay lines.

FIG. 3 shows a time switch according to the invention, consisting of a connection circuit 22 and a control memory 23.

The connection circuit 22 comprises D delay lines, L1, L2 . . . LD, and an output circuit 24. The delay lines L1, L2 . . . LD, having a respective length of *o*, *d* (D–2) *d*,(D–1) *d*, *d* being the duration of a channel of the input multiplex, have their inputs directly connected to the input multiplex *e* and their outputs connected to the inputs of an output circuit 24.

The output circuit 24 consists essentially of a multiplexer comprising D inputs, an output and a control means 5; the inputs of the said circuit are connected to the outputs of the delay lines L1, L2 . . . LD, the output to the output multiplex *s*, and the control means input to the calculating circuit 25.

The control circuit 23 comprises a time slot generator 32 for input time slots E, a time slot generator 26 for output time slots S, a calculating circuit 25, and a connection memory 40. The time slot generator 26 for output time slots S is synchronized by the clock pulse *hs* and the frame locking word Ts of the output multiplex, and its output is connected to the reading address circuit 27 of the connection memory 40.

The connection memory 40 consists of an addressable matrix memory 28, having a capacity of so words comprising log (2) eo binary elements, in the hypothetical case where the control time slots are in binary code; of a writing address circuit 29; of an input circuit 30; of a reading address circuit 27; and of an output circuit 31. The inputs of the circuits 29 and 30 are connected up to the control calculators exterior to the switch, which, through the said circuits, write in the memory 28, the data concerning the connections. The output of the memory output circuit 31 is connected to the calculating circuit 25.

The time slot generator 32 for time slots E of the input multiplex *e* is synchronized by the clock pulse *he* and the frame locking word TE of the input multiplex *e*, and its output is connected to the calculating circuit 25.

The calculating circuit 25 has its inputs respectively connected up to the time slot generator 32 and to the output circuit 31 of the connection memory 40, and its output is connected to the input 5 of the output circuit 24 of the connection circuit 22.

At the instant when a connection EiSj is established, the control calculators write the corresponding data Ei contained in the memory 28 at the address Sj, through the circuits 29 and 30.

This memorized data is automatically read, when the time slot Sj passes at the output of the generator 26, thrugh the circuit 27, and applied at the output of the output circuit 31 of the connection memory 40; it is also applied to the input of the calculating circuit 25, which receives simultaneously a time slot Ek through the input time slot generator 32.

The calculating circuit then determines the time R which has passed since the passing of the data Ei on the input data multiplex Ei, this being R = Ek–Ei and determined Dij after analysis of the sign of R.

R ⩾ *o* Dij = R = Ek–Ei

R < *o* Dij = $e^{o+}$Ek–Ei

The time slot Dij displayed at the output of 25 positions the output circuit 24 of the connection circuit on the line introducing a delay *d*. Dij, at whose output the data Ei is then applied and thus ensures its passing on the channel Sj of the ouput multiplex.

It should be observed that if a multiplex synchronizing system is inserted between the input multiplex *e* and the delay lines, the resyncrhonizing channel jumps must be emitted by a link, not shown, towards the calculating circuit 25 which then effects, on R, the necessary corrections, as a function of the data received.

Disconnections or breaks in communication take place as already described by erasing the contents of the word Sj in the connection memrory 4C.

Figure 4:
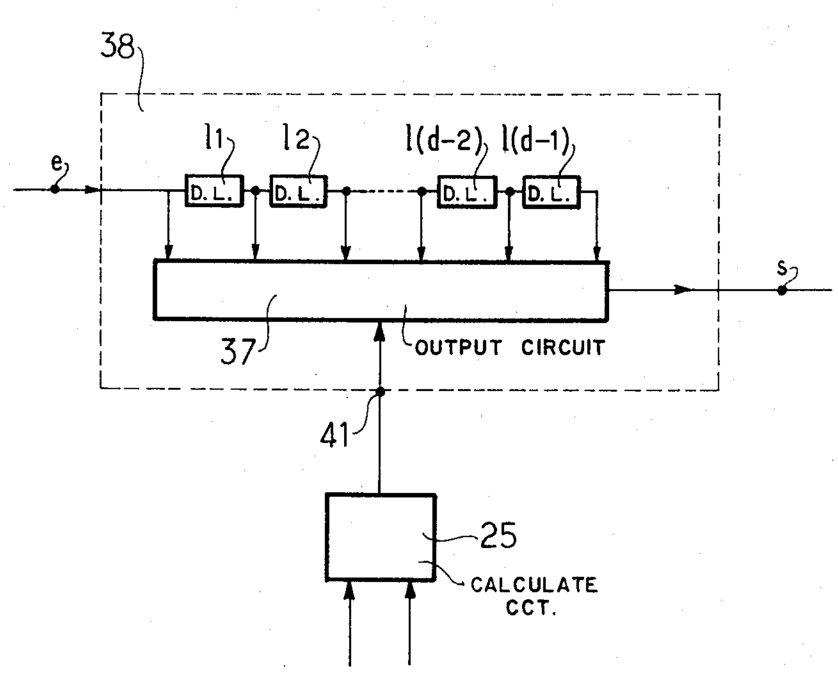
FIG. 4 is a schematic block diagram of a switch operating on the principle of the switch illustrated in FIG. 3, but implementing a connection circuit consisting of a single tapped wire.

FIG. 4 shows a connection circuit 38 according to the invention, controlled by a calculating circuit 25.

The connection circuit 38 consists of D–1 delay lines 11, 12, 13, (D–1), having the same length *d* connected in series and constituting a single line with D intermediate tappings or outputs, connected to the inputs of an output circuit 37 whose output is connected up to the output multiplex *s* and whose control input 41 is connected up to the calculating circuit 25.

Such a connection circuit can be used instead and in the place of the connection circuit in FIG. 3, with the same control memroyr 23; the connection circuit 38 is therefore connected up to the calculating circuit 25 of that control memory 23.

Operation is strictly the same as that of the switch shown in FIG. 3.

According to a preferred embodiment of the invention, the delay lines consist of shift registers produced from integrated circuits supplied in trade by various manufactures; the other circuits, memories, input circuit, output circuit, calculating circuit, being produced from integrated circuits of the same family.

In that structure, the lines are of the parallel or series propagation type, but in the latter case, the advance clock pulse in the lines is pF, *p* being the number of moments of the data code and F, the multiplex channel frequency.

It must also be observed that in the case of FIGS. 1 and 2, the advance clock pulse in the lines is elaborated from the clock pulse of the output multiplex, and in the case of FIGS. 3 and 4, from the clock pulse of the input multiplex.

Examples of detailed diagrams have been described in the above-referenced patent application, more particularly, here, inasmuch as concerns memories.

These switches are particularly interseting in the cross-connecting of time-division and non-digital modulation multiplexes; in coded digital modulation they enable just as well the production of low operating frequency connection networks, as the production of networks having a small number of stages operating at very high frequencies, as may be the case in telephone connection networks.

It must be udnerstood that the invention is in no way limited to the embodiments described and illustrated, which have been given only by way of examples; more particularly, without going beyond the scope of the invention, certain arrangements may be modified or certain means may be replaced by equivalent means.

I claim:

1. A time switch for enabling data from a multi-channel time division input multiplex system to be distributed to a multi-channel time division output multiplex system by connecting an input time channel to a selected output time channel, said input and output multiplex systems having a variable frame phase but being in phase in the channels, the channels each having the same duration and being syncrhonous, comprising propagation means for propagating data for different time periods between said input multiplex system and said output multiplex system, and control circuit means responsive to the difference in actual time in each frame separating an input multiplex channel from a selected output multiplex channel for propagating said data through said propagation means for a time period corresponding to said difference, said control circuit means inculding connection memory means for storing in a time slot corresponding to each input channel the address of the output channel to which said input channels are to be connected. calculating means for calculating in each frame the actual time separating an input multiplex channel from the output multplex channel designated therewith in said connection memory means, and selection means responsive to said calculating means for controlling the propagation time of said data through said prpagation means.

2. A time switch according to claim 1 wherein said propagation means comprises a connection circuit including as many delay lines arranged in parallel paths between said multiplex systems as there are channels in each multiplex system, each delay line providing a delay which is a progressive multiple of a unit delay equal to the duration of one channel.

3. A time switch according to claim 2 wherein said connection circuit further includes input circuit means responsive to said control circuit means for connecting the input multiplex system to the input of said delay lines according to the successive channels of the output multiplex frame to route data from an incoming channel to an outgoing channel by way of a delay line selected by said calculating means, the outputs of said delay lines being connected together to said output multiplex system.

4. A time switch according to claim 2 wherein said connection circuit further includes output circuit means responsive to said control circuit means for connecting the outputs of said delay lines selectively to said output multiplex system according to the successive channels of the input multiplex frame to derive data from an outgoing channel from a delay line selected by said calculating means, the inputs of said delay lines being connected together to said input multiplex system.

5. A time switch according to claim 1 wherein said propagation means comprises a connection circuit including an output circuit and a delay line having a delay time of (D–1) *d* and consisting of (D–1) elementary delay lines having a delay time of *d* connected in series, the delay line having D outputs, where D is the number of channels in each multiplex system connected to said output circuit which is controlled by said calculating means.

6. A time switch accroding to claim 1 wherein said propagation means includes input circuit means responsive to said control circuit means for connecting the input multiplex system to said propagation means and output circuit means responsive to said control circuit means for connecting said propagation means to said output multiplex system.

7. A time switch according to claim 6 wherein said control circuit means further includes output control memory means responsive to the outupt of said calculating means and said connection memory means for controlling said output circuit to connect said delay lines to said output multiplex system in accordance with the output channel addresses stored therein.

8. A time switch according to claim 1 wherein said input and output multiplex systems have the same frame time T, and said propagation means including D delay lines each providing a delay which is a progressive multiple of a unit delay *d* equal to the duration of one channel with D times *d* being reater than T for non-blocking operation.

9. A time switch according to claim 1 wherein said control circuit means further includes input time slot generator means for reading data from said connection memory means to said calculating means in time with said input multiplex system and output time slot generator means for applying to said calculating means the addresses of said output channels in time with said output multiplex system.

* * * * *